(12) United States Patent
Zhan et al.

(10) Patent No.: US 11,846,151 B2
(45) Date of Patent: Dec. 19, 2023

(54) REPAIRING A CASED WELLBORE (71) Applicant: Saudi Arabian Oil Company, Dhahran (SA)

(72) Inventors: Guodong Zhan, Dhahran (SA); Jianhui Xu, Dhahran (SA); Abdulwahab Al-Johar, Dhahran (SA); Bodong Li, Dhahran (SA); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 170 days.

(21) Appl. No.: 17/196,776

(22) Filed: Mar. 9, 2021

(65) Prior Publication Data
US 2022/0290518 A1    Sep. 15, 2022

(51) Int. Cl.
*E21B 29/02*    (2006.01)
*E21B 21/14*    (2006.01)
*E21B 33/124*   (2006.01)

(52) U.S. Cl.
CPC .............. *E21B 29/02* (2013.01); *E21B 21/14* (2013.01); *E21B 33/124* (2013.01)

(58) Field of Classification Search
CPC .......... E21B 29/00; E21B 29/02; E21B 29/10; E21B 33/124
See application file for complete search history.

(56) References Cited

U.S. PATENT DOCUMENTS

| 891,957 A | 6/1908 | Schubert |
| 2,043,225 A | 6/1936 | Armentrout et al. |
| 2,110,913 A | 3/1938 | Lowrey |
| 2,227,729 A | 1/1941 | Lynes |
| 2,286,673 A | 6/1942 | Douglas |

(Continued)

FOREIGN PATENT DOCUMENTS

| AU | 2005286168 | 3/2006 |
| CA | 1226325 | 9/1987 |

(Continued)

OTHER PUBLICATIONS

PCT International Search Report and Written Opinion in International Appln. No. PCT/US2022/019287, dated Apr. 25, 2022, 14 pages.

(Continued)

*Primary Examiner* — David Carroll
(74) *Attorney, Agent, or Firm* — Fish & Richardson P.C.

(57) ABSTRACT

A repairing assembly includes a housing, a packer, and a thermal spray assembly. The housing is attached to a wellbore string disposed within a wellbore with casing. The packer is coupled to the housing. The packer is set on a wall of the wellbore to bound a repair zone defined between the packer and an end of the housing opposite the packer. The housing or the packer includes a fluid channel in fluid communication with the wellbore string or an annulus of the wellbore. The thermal spray assembly is coupled to the housing and sprays a damaged section of the casing with a thermal spray to repair the damaged section. The housing flows an inert gas received from the wellbore string or the annulus of the wellbore and through the fluid channel into the repair zone until an oxygen in the repair zone is substantially removed from the repair zone.

11 Claims, 5 Drawing Sheets

(56) References Cited

U.S. PATENT DOCUMENTS

| | | |
|---|---|---|
| 2,305,062 A | 12/1942 | Church et al. |
| 2,344,120 A | 3/1944 | Baker |
| 2,757,738 A | 9/1948 | Ritchey |
| 2,509,608 A | 5/1950 | Penfield |
| 2,688,369 A | 9/1954 | Broyles |
| 2,690,897 A | 10/1954 | Clark |
| 2,719,363 A | 10/1955 | Richard et al. |
| 2,763,314 A | 9/1956 | Gill |
| 2,795,279 A | 6/1957 | Erich |
| 2,799,641 A | 7/1957 | Gordon |
| 2,805,045 A | 9/1957 | Goodwin |
| 2,822,150 A | 2/1958 | Muse et al. |
| 2,841,226 A | 7/1958 | Conrad et al. |
| 2,899,000 A | 8/1959 | Medders et al. |
| 2,927,775 A | 3/1960 | Hildebrandt |
| 3,016,244 A | 1/1962 | Friedrich et al. |
| 3,028,915 A | 4/1962 | Jennings |
| 3,071,399 A | 1/1963 | Cronin |
| 3,087,552 A | 4/1963 | Graham |
| 3,102,599 A | 9/1963 | Hillburn |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,220,478 A | 11/1965 | Kinzbach |
| 3,236,307 A | 2/1966 | Brown |
| 3,253,336 A | 5/1966 | Browr |
| 3,268,003 A | 8/1966 | Essary |
| 3,331,439 A | 7/1967 | Lawrence |
| 3,428,125 A | 2/1969 | Parker |
| 3,468,373 A | 9/1969 | Smith |
| 3,522,848 A | 8/1970 | New |
| 3,547,192 A | 12/1970 | Claridge et al. |
| 3,547,193 A | 12/1970 | Gill |
| 3,632,369 A | 1/1972 | Hahn et al. |
| 3,642,066 A | 2/1972 | Gill |
| 3,656,564 A | 4/1972 | Brown |
| 3,696,866 A | 10/1972 | Dryden |
| 3,839,791 A | 10/1974 | Feamster |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,017,480 A | 4/1977 | Baum |
| 4,064,211 A | 12/1977 | Wood |
| 4,084,637 A | 4/1978 | Todd |
| 4,129,437 A | 12/1978 | Taguchi et al. |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,255,165 A | 3/1981 | Dennis et al. |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,337,653 A | 7/1982 | Chauffe |
| 4,343,651 A | 8/1982 | Yazu et al. |
| 4,354,559 A | 10/1982 | Johnson |
| 4,370,538 A | 1/1983 | Browning |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,413,642 A | 11/1983 | Smith et al. |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,525,178 A | 6/1985 | Hall |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,636,934 A | 1/1987 | Schwendemann |
| RE32,345 E | 3/1987 | Wood |
| 4,660,636 A | 4/1987 | Rundell et al. |
| 4,705,108 A | 11/1987 | Little et al. |
| 4,817,711 A | 4/1989 | Jearnbey |
| 4,943,488 A | 7/1990 | Sung et al. |
| 4,945,073 A | 7/1990 | Dubensky et al. |
| 5,012,863 A | 5/1991 | Springer |
| 5,018,580 A | 5/1991 | Skipper |
| 5,037,704 A | 8/1991 | Nakai et al. |
| 5,055,180 A | 10/1991 | Klaila |
| 5,068,819 A | 11/1991 | Misra et al. |
| 5,070,952 A | 12/1991 | Neff |
| 5,074,355 A | 12/1991 | Lennon |
| 5,082,054 A | 1/1992 | Kiamanesh |
| 5,092,056 A | 3/1992 | Deaton |
| 5,096,465 A | 3/1992 | Chen et al. |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,326,380 A | 7/1994 | Yao et al. |
| 5,370,195 A | 12/1994 | Keshavan et al. |
| 5,387,776 A | 2/1995 | Preiser |
| 5,388,648 A | 2/1995 | Jordan, Jr. |
| 5,490,598 A | 2/1996 | Adams |
| 5,501,248 A | 3/1996 | Kiest, Jr. |
| 5,523,158 A | 6/1996 | Kapoor et al. |
| 5,595,252 A | 1/1997 | O'Hanlon |
| 5,603,070 A | 2/1997 | Cerutti et al. |
| 5,690,826 A | 11/1997 | Cravello |
| 5,803,186 A | 9/1998 | Berger et al. |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,955,666 A | 9/1999 | Mullins |
| 5,958,236 A | 9/1999 | Bakula |
| RE36,362 E | 11/1999 | Jackson |
| 5,987,385 A | 11/1999 | Varsamis et al. |
| 6,008,153 A | 12/1999 | Kukino et al. |
| 6,012,526 A | 1/2000 | Jennings et al. |
| 6,032,742 A | 3/2000 | Tomlin et al. |
| 6,041,860 A * | 3/2000 | Nazzal ............... E21B 33/127 |
| | | 73/152.01 |
| 6,047,239 A * | 4/2000 | Berger ............... E21B 49/088 |
| | | 702/9 |
| 6,096,436 A | 8/2000 | Inspektor |

(56) References Cited

U.S. PATENT DOCUMENTS

| | | |
|---|---|---|
| 6,170,531 B1 | 1/2001 | Jung et al. |
| 6,173,795 B1 | 1/2001 | McGarian et al. |
| 6,189,611 B1 | 2/2001 | Kasevich |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,287,079 B1 | 9/2001 | Gosling et al. |
| 6,290,068 B1 | 9/2001 | Adams et al. |
| 6,305,471 B1 | 10/2001 | Milloy |
| 6,325,216 B1 | 12/2001 | Seyffert et al. |
| 6,328,111 B1 | 12/2001 | Bearden et al. |
| 6,330,913 B1 | 12/2001 | Langseth et al. |
| 6,354,371 B1 | 3/2002 | O'Blanc |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,469,278 B1 | 10/2002 | Boyce |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,622,554 B2 | 9/2003 | Manke et al. |
| 6,623,850 B2 | 9/2003 | Kukino et al. |
| 6,629,610 B1 | 10/2003 | Adams et al. |
| 6,637,092 B1 | 10/2003 | Menzel |
| 6,678,616 B1 | 1/2004 | Winkler et al. |
| 6,722,504 B2 | 4/2004 | Schulte et al. |
| 6,741,000 B2 | 5/2004 | Newcomb |
| 6,761,230 B2 | 7/2004 | Cross et al. |
| 6,814,141 B2 | 11/2004 | Huh et al. |
| 6,827,145 B2 | 12/2004 | Fotland et al. |
| 6,845,818 B2 | 1/2005 | Tutuncu et al. |
| 6,850,068 B2 | 2/2005 | Chernali et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,013,992 B2 | 3/2006 | Tessari et al. |
| 7,048,051 B2 | 5/2006 | McQueen |
| 7,063,155 B2 | 6/2006 | Ruttley |
| 7,086,463 B2 | 8/2006 | Ringgenberg et al. |
| 7,091,460 B2 | 8/2006 | Kinzer |
| 7,109,457 B2 | 9/2006 | Kinzer |
| 7,115,847 B2 | 10/2006 | Kinzer |
| 7,124,819 B2 | 10/2006 | Ciglenec et al. |
| 7,131,498 B2 | 11/2006 | Campo et al. |
| 7,216,767 B2 | 5/2007 | Schulte et al. |
| 7,255,582 B1 | 8/2007 | Liao |
| 7,312,428 B2 | 12/2007 | Kinzer |
| 7,322,776 B2 | 1/2008 | Webb et al. |
| 7,331,385 B2 | 2/2008 | Symington |
| 7,376,514 B2 | 5/2008 | Habashy et al. |
| 7,387,174 B2 | 6/2008 | Lurie |
| 7,441,610 B2 | 10/2008 | Belnap et al. |
| 7,445,041 B2 | 11/2008 | O'Brien |
| 7,455,117 B1 | 11/2008 | Hall et al. |
| 7,461,693 B2 | 12/2008 | Considine et al. |
| 7,484,561 B2 | 2/2009 | Bridges |
| 7,539,548 B2 | 5/2009 | Dhawan |
| 7,562,708 B2 | 7/2009 | Cogliandro et al. |
| 7,629,497 B2 | 12/2009 | Pringle |
| 7,631,691 B2 | 12/2009 | Symington et al. |
| 7,645,513 B2 | 1/2010 | Bello et al. |
| 7,647,980 B2 | 1/2010 | Corre et al. |
| 7,647,992 B2 | 1/2010 | Fang et al. |
| 7,650,269 B2 | 1/2010 | Rodney |
| 7,677,673 B2 | 3/2010 | Tranquilla et al. |
| 7,730,625 B2 | 6/2010 | Blake |
| 7,779,903 B2 | 8/2010 | Bailey et al. |
| 7,828,057 B2 | 11/2010 | Kearl et al. |
| 7,909,096 B2 | 3/2011 | Clark et al. |
| 7,951,482 B2 | 5/2011 | Ichinose et al. |
| 7,980,392 B2 | 7/2011 | Varco |
| 8,067,865 B2 | 11/2011 | Savant |
| 8,096,349 B2 | 1/2012 | Considine et al. |
| 8,210,256 B2 | 7/2012 | Bridges et al. |
| 8,237,444 B2 | 8/2012 | Simon |
| 8,245,792 B2 | 8/2012 | Trinh et al. |
| 8,275,549 B2 | 9/2012 | Sabag et al. |
| 8,286,734 B2 | 10/2012 | Hannegan et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,636,063 B2 | 1/2014 | Ravi et al. |
| 8,678,087 B2 | 3/2014 | Schultz et al. |
| 8,683,859 B2 | 4/2014 | Godager |
| 8,776,609 B2 | 7/2014 | Dria et al. |
| 8,794,062 B2 | 8/2014 | DiFoggio et al. |
| 8,824,240 B2 | 9/2014 | Roberts et al. |
| 8,884,624 B2 | 11/2014 | Homan et al. |
| 8,925,213 B2 | 1/2015 | Sallwasser |
| 8,960,215 B2 | 2/2015 | Cui et al. |
| 8,973,680 B2 | 3/2015 | MacKenzie |
| 9,051,810 B1 | 6/2015 | Cuffe et al. |
| 9,109,429 B2 | 8/2015 | Xu et al. |
| 9,217,291 B2 | 12/2015 | Batarseh |
| 9,217,323 B2 | 12/2015 | Clark |
| 9,222,350 B2 | 12/2015 | Vaughn et al. |
| 9,238,953 B2 | 1/2016 | Fleming et al. |
| 9,238,961 B2 | 1/2016 | Bedouet |
| 9,250,339 B2 | 2/2016 | Ramirez |
| 9,353,589 B2 | 5/2016 | Hekelaar |
| 9,394,782 B2 | 7/2016 | DiGiovanni et al. |
| 9,435,159 B2 | 9/2016 | Scott |
| 9,464,487 B1 | 10/2016 | Zurn |
| 9,470,059 B2 | 10/2016 | Zhou |
| 9,492,885 B2 | 11/2016 | Zediker et al. |
| 9,494,010 B2 | 11/2016 | Flores |
| 9,494,032 B2 | 11/2016 | Roberson et al. |
| 9,528,366 B2 | 12/2016 | Selman et al. |
| 9,562,987 B2 | 2/2017 | Guner et al. |
| 9,567,819 B2 | 2/2017 | Cavender et al. |
| 9,617,815 B2 | 4/2017 | Schwartze et al. |
| 9,664,011 B2 | 5/2017 | Kruspe et al. |
| 9,702,211 B2 | 7/2017 | Tinnen |
| 9,731,471 B2 | 8/2017 | Schaedler et al. |
| 9,739,141 B2 | 8/2017 | Zeng et al. |
| 9,757,796 B2 | 9/2017 | Sherman et al. |
| 9,765,609 B2 | 9/2017 | Chemali et al. |
| 9,845,653 B2 | 12/2017 | Hannegan et al. |
| 9,903,010 B2 | 2/2018 | Doud et al. |
| 9,976,381 B2 | 5/2018 | Martin et al. |
| 10,000,983 B2 | 6/2018 | Jackson et al. |
| 10,113,408 B2 | 10/2018 | Pobedinski et al. |
| 10,118,223 B2 | 11/2018 | Eason |
| 10,174,577 B2 | 1/2019 | Leuchtenberg et al. |
| 10,233,372 B2 | 3/2019 | Ramasamy et al. |
| 10,329,877 B2 | 6/2019 | Simpson et al. |
| 10,352,125 B2 | 7/2019 | Frazier |
| 10,392,910 B2 | 8/2019 | Walton et al. |
| 10,394,193 B2 | 8/2019 | Li et al. |
| 10,544,640 B2 | 1/2020 | Hekelaar |
| 10,551,800 B2 | 2/2020 | Li et al. |
| 10,641,079 B2 | 5/2020 | Aljubran et al. |
| 10,673,238 B2 | 6/2020 | Boone et al. |
| 10,927,618 B2 | 2/2021 | Albahrani et al. |
| 2002/0066563 A1 | 6/2002 | Langseth et al. |
| 2002/0139528 A1* | 10/2002 | Surjaatmadja .......... E21B 29/10 166/59 |
| 2003/0052098 A1 | 3/2003 | Kim et al. |
| 2003/0159776 A1 | 8/2003 | Graham |
| 2003/0230526 A1 | 12/2003 | Okabayshi et al. |
| 2004/0182574 A1 | 9/2004 | Sarmad et al. |
| 2004/0256103 A1 | 12/2004 | Batarseh |
| 2005/0022987 A1 | 2/2005 | Green et al. |
| 2005/0092523 A1 | 5/2005 | McCaskill et al. |
| 2005/0199386 A1 | 9/2005 | Kinzer |

(56) References Cited

U.S. PATENT DOCUMENTS

| | | |
|---|---|---|
| 2005/0259512 A1 | 11/2005 | Mandal |
| 2006/0016592 A1 | 1/2006 | Wu |
| 2006/0076347 A1 | 4/2006 | Kinzer |
| 2006/0102625 A1 | 5/2006 | Kinzer |
| 2006/0106541 A1 | 5/2006 | Hassan et al. |
| 2006/0144620 A1 | 7/2006 | Cooper |
| 2006/0185843 A1 | 8/2006 | Smith |
| 2006/0248949 A1* | 11/2006 | Gregory ............ E21B 49/088 73/152.51 |
| 2006/0249307 A1 | 11/2006 | Ritter |
| 2007/0000662 A1 | 1/2007 | Symington et al. |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0153626 A1 | 7/2007 | Hayes et al. |
| 2007/0175633 A1 | 8/2007 | Kosmala |
| 2007/0181301 A1 | 8/2007 | O'Brien |
| 2007/0187089 A1 | 8/2007 | Bridges |
| 2007/0193744 A1 | 8/2007 | Bridges |
| 2007/0204994 A1 | 9/2007 | Wimmersperg |
| 2007/0261844 A1 | 11/2007 | Cogliandro et al. |
| 2007/0289736 A1 | 12/2007 | Kearl et al. |
| 2008/0007421 A1 | 1/2008 | Liu et al. |
| 2008/0047337 A1 | 2/2008 | Chemali et al. |
| 2008/0053652 A1 | 3/2008 | Corre et al. |
| 2008/0073079 A1 | 3/2008 | Tranquilla et al. |
| 2008/0173443 A1 | 7/2008 | Symington et al. |
| 2008/0173480 A1 | 7/2008 | Annaiyappa et al. |
| 2008/0190822 A1 | 8/2008 | Young |
| 2008/0308282 A1 | 12/2008 | Standridge et al. |
| 2008/0312892 A1 | 12/2008 | Heggemann |
| 2009/0153354 A1 | 6/2009 | Daussin |
| 2009/0164125 A1 | 6/2009 | Bordakov et al. |
| 2009/0178809 A1 | 7/2009 | Jeffryes et al. |
| 2009/0259446 A1 | 10/2009 | Zhang et al. |
| 2009/0288820 A1 | 11/2009 | Barron et al. |
| 2010/0006339 A1 | 1/2010 | Desai |
| 2010/0089583 A1 | 4/2010 | Xu et al. |
| 2010/0186955 A1 | 7/2010 | Saasen et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0031026 A1 | 2/2011 | Oxford et al. |
| 2011/0058916 A1 | 3/2011 | Toosky |
| 2011/0120732 A1 | 5/2011 | Lurie |
| 2011/0155368 A1 | 6/2011 | El-Khazindar |
| 2012/0012319 A1 | 1/2012 | Dennis |
| 2012/0075615 A1 | 3/2012 | Niclass et al. |
| 2012/0111578 A1 | 5/2012 | Tverlid |
| 2012/0132418 A1 | 5/2012 | McClung |
| 2012/0132468 A1 | 5/2012 | Scott et al. |
| 2012/0152543 A1 | 6/2012 | Davis |
| 2012/0169841 A1 | 6/2012 | Chemali et al. |
| 2012/0173196 A1 | 7/2012 | Miszewski |
| 2012/0181020 A1 | 7/2012 | Barron et al. |
| 2012/0186817 A1 | 7/2012 | Gibson et al. |
| 2012/0222854 A1 | 9/2012 | McClung, III |
| 2012/0227983 A1 | 9/2012 | Lymberopoulous et al. |
| 2012/0273187 A1 | 11/2012 | Hall |
| 2012/0325564 A1 | 12/2012 | Vaughn et al. |
| 2013/0008653 A1* | 1/2013 | Schultz .................. E21B 29/06 166/285 |
| 2013/0008671 A1 | 1/2013 | Booth |
| 2013/0025943 A1 | 1/2013 | Kumar |
| 2013/0037268 A1 | 2/2013 | Kleefisch et al. |
| 2013/0068525 A1 | 3/2013 | Digiovanni |
| 2013/0076525 A1 | 3/2013 | Vu et al. |
| 2013/0125642 A1 | 5/2013 | Parfitt |
| 2013/0126164 A1 | 5/2013 | Sweatman et al. |
| 2013/0146359 A1 | 6/2013 | Koederitz |
| 2013/0191029 A1 | 7/2013 | Heck, Sr. |
| 2013/0213637 A1 | 8/2013 | Kearl |
| 2013/0255936 A1 | 10/2013 | Statoilydro et al. |
| 2013/0269945 A1 | 10/2013 | Mulholland et al. |
| 2013/0308424 A1 | 11/2013 | Kumar |
| 2014/0034144 A1 | 2/2014 | Cui et al. |
| 2014/0047776 A1 | 2/2014 | Scott |
| 2014/0083771 A1 | 3/2014 | Clark |
| 2014/0090846 A1 | 4/2014 | Deutch |
| 2014/0132468 A1 | 5/2014 | Scott et al. |
| 2014/0183143 A1 | 7/2014 | Cady et al. |
| 2014/0231075 A1 | 8/2014 | Springett et al. |
| 2014/0231147 A1 | 8/2014 | Bozso et al. |
| 2014/0238658 A1 | 8/2014 | Wilson et al. |
| 2014/0246235 A1 | 9/2014 | Yao |
| 2014/0251593 A1 | 9/2014 | Oberg et al. |
| 2014/0251894 A1 | 9/2014 | Larson et al. |
| 2014/0265337 A1 | 9/2014 | Harding et al. |
| 2014/0278111 A1 | 9/2014 | Gerrie et al. |
| 2014/0291023 A1 | 10/2014 | Edbury |
| 2014/0300895 A1 | 10/2014 | Pope et al. |
| 2014/0326506 A1 | 11/2014 | Difoggio |
| 2014/0333754 A1 | 11/2014 | Graves et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0027724 A1* | 1/2015 | Symms ............... E21B 33/1243 166/373 |
| 2015/0075714 A1 | 3/2015 | Sun et al. |
| 2015/0083422 A1 | 3/2015 | Pritchard |
| 2015/0091737 A1 | 4/2015 | Richardson et al. |
| 2015/0101864 A1 | 4/2015 | May |
| 2015/0129306 A1 | 5/2015 | Coffman et al. |
| 2015/0159467 A1 | 6/2015 | Hartman et al. |
| 2015/0211362 A1 | 7/2015 | Rogers |
| 2015/0267500 A1 | 9/2015 | Van Dongen |
| 2015/0284833 A1 | 10/2015 | Hsiao et al. |
| 2015/0290878 A1 | 10/2015 | Houben et al. |
| 2015/0300151 A1 | 10/2015 | Mohaghegh |
| 2016/0053572 A1 | 2/2016 | Snoswell |
| 2016/0053604 A1 | 2/2016 | Abbassian |
| 2016/0076357 A1 | 3/2016 | Hbaieb |
| 2016/0115783 A1 | 4/2016 | Zeng et al. |
| 2016/0130928 A1 | 5/2016 | Torrione et al. |
| 2016/0153240 A1 | 6/2016 | Braga et al. |
| 2016/0160106 A1 | 6/2016 | Jamison et al. |
| 2016/0237810 A1 | 8/2016 | Beaman et al. |
| 2016/0247316 A1 | 8/2016 | Whalley et al. |
| 2016/0339517 A1 | 11/2016 | Joshi et al. |
| 2016/0356125 A1 | 12/2016 | Bello et al. |
| 2017/0051785 A1 | 2/2017 | Cooper |
| 2017/0077705 A1 | 3/2017 | Kuttel et al. |
| 2017/0161885 A1 | 6/2017 | Parmeshwar et al. |
| 2017/0234104 A1 | 8/2017 | James |
| 2017/0292376 A1 | 10/2017 | Kumar et al. |
| 2017/0314335 A1 | 11/2017 | Kosonde et al. |
| 2017/0328196 A1 | 11/2017 | Shi et al. |
| 2017/0328197 A1 | 11/2017 | Shi et al. |
| 2017/0332482 A1 | 11/2017 | Hauslmann |
| 2017/0342776 A1 | 11/2017 | Bullock et al. |
| 2017/0350201 A1 | 12/2017 | Shi et al. |
| 2017/0350241 A1 | 12/2017 | Shi |
| 2018/0010030 A1 | 1/2018 | Ramasamy et al. |
| 2018/0010419 A1 | 1/2018 | Livescu et al. |
| 2018/0029942 A1 | 2/2018 | Ishida |
| 2018/0171772 A1 | 6/2018 | Rodney |
| 2018/0171774 A1 | 6/2018 | Ringer et al. |
| 2018/0177064 A1 | 6/2018 | Van Pol et al. |
| 2018/0187498 A1 | 7/2018 | Soto et al. |
| 2018/0265416 A1 | 9/2018 | Ishida et al. |
| 2018/0266226 A1 | 9/2018 | Batarseh et al. |
| 2018/0326679 A1* | 11/2018 | Weisenberg ............ B29C 73/12 |
| 2018/0334883 A1 | 11/2018 | Williamson |
| 2018/0363404 A1 | 12/2018 | Faugstad |
| 2019/0049054 A1 | 2/2019 | Gunnarsson et al. |
| 2019/0101872 A1 | 4/2019 | Li |
| 2019/0145183 A1 | 5/2019 | Potash |
| 2019/0227499 A1 | 7/2019 | Li et al. |
| 2019/0257180 A1 | 8/2019 | Kriesels et al. |
| 2019/0257187 A1* | 8/2019 | Aljubran ................. G01V 1/48 |
| 2019/0267805 A1 | 8/2019 | Kothuru et al. |
| 2020/0032638 A1 | 1/2020 | Ezzeddine |

(56) References Cited

U.S. PATENT DOCUMENTS

| | | |
|---|---|---|
| 2020/0125040 A1 | 4/2020 | Li et al. |
| 2020/0182043 A1 | 6/2020 | Downey et al. |
| 2020/0240258 A1 | 7/2020 | Stokely et al. |
| 2020/0248546 A1 | 8/2020 | Torrione et al. |
| 2020/0370381 A1 | 11/2020 | Al-Rubaii et al. |
| 2020/0371495 A1 | 11/2020 | Al-Rubaii et al. |
| 2021/0032934 A1 | 2/2021 | Zhan et al. |
| 2021/0032935 A1 | 2/2021 | Zhan et al. |
| 2021/0032936 A1 | 2/2021 | Zhan et al. |
| 2021/0034029 A1 | 2/2021 | Zhan et al. |
| 2021/0156243 A1* | 5/2021 | Aljubran ............... E21B 47/117 |

FOREIGN PATENT DOCUMENTS

| | | |
|---|---|---|
| CA | 2249432 | 9/2005 |
| CA | 2537585 | 8/2006 |
| CA | 2376963 | 2/2009 |
| CA | 2669721 | 7/2011 |
| CA | 2594042 | 8/2012 |
| CN | 101079591 | 11/2007 |
| CN | 200989202 | 12/2007 |
| CN | 102493813 | 6/2012 |
| CN | 203232293 | 10/2013 |
| CN | 104295448 | 1/2015 |
| CN | 204627586 | 9/2015 |
| CN | 106119763 | 11/2016 |
| CN | 107462222 | 12/2017 |
| CN | 109437920 | 3/2019 |
| CN | 110571475 | 12/2019 |
| DE | 102008001607 | 11/2009 |
| DE | 102011008809 | 7/2012 |
| DE | 102012022453 | 5/2014 |
| DE | 102013200450 | 7/2014 |
| DE | 102012205757 | 8/2014 |
| EP | 0437855 | 7/1991 |
| EP | 2317068 | 5/2011 |
| EP | 2574722 | 4/2013 |
| EP | 2737173 | 6/2014 |
| EP | 3333141 | 6/2018 |
| FR | 3051699 | 12/2017 |
| GB | 1572460 | 7/1980 |
| GB | 1574615 | 9/1980 |
| GB | 2124855 | 2/1984 |
| GB | 2357305 | 6/2001 |
| GB | 2399515 | 9/2004 |
| GB | 2422125 | 7/2006 |
| GB | 2532967 | 6/2016 |
| JP | S 62274034 | 11/1987 |
| JP | 2009067609 | 4/2009 |
| JP | 4275896 | 6/2009 |
| JP | 5013156 | 8/2012 |
| JP | 2013110910 | 6/2013 |
| NO | 343139 | 11/2018 |
| NO | 20161842 | 5/2019 |
| RU | 2282708 | 8/2006 |
| RU | 122531 | 11/2012 |
| WO | WO 1981003295 | 11/1981 |
| WO | WO 1995035429 | 12/1995 |
| WO | WO 1997021904 | 6/1997 |
| WO | WO 1999036658 | 7/1999 |
| WO | WO 2000025942 | 5/2000 |
| WO | WO 2000031374 | 6/2000 |
| WO | WO 2001042622 | 6/2001 |
| WO | WO 2002020944 | 3/2002 |
| WO | WO 2002068793 | 9/2002 |
| WO | WO 2004042185 | 5/2004 |
| WO | WO 2006032984 | 3/2006 |
| WO | WO 2007049026 | 5/2007 |
| WO | WO 2007070305 | 6/2007 |
| WO | WO 2008146017 | 12/2008 |
| WO | WO 2009020889 | 2/2009 |
| WO | WO 2009113895 | 9/2009 |
| WO | WO 2010054353 | 5/2010 |
| WO | WO 2010105177 | 9/2010 |
| WO | WO 2011038170 | 3/2011 |
| WO | WO 2011042622 | 6/2011 |
| WO | WO 2011130159 | 10/2011 |
| WO | WO 2011139697 | 11/2011 |
| WO | WO 2012007407 | 1/2012 |
| WO | WO 2013016095 | 1/2013 |
| WO | WO 2013148510 | 10/2013 |
| WO | WO 2014127035 | 8/2014 |
| WO | WO 2015072971 | 5/2015 |
| WO | WO 2015095155 | 6/2015 |
| WO | WO 2016178005 | 11/2016 |
| WO | WO 2017011078 | 1/2017 |
| WO | WO 2017027105 | 2/2017 |
| WO | WO 2017132297 | 8/2017 |
| WO | WO 2017196303 | 11/2017 |
| WO | WO 2018022198 | 2/2018 |
| WO | WO 2018046361 | 3/2018 |
| WO | WO 2018167022 | 9/2018 |
| WO | WO 2018169991 | 9/2018 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019164692 | 8/2019 |
| WO | WO 2019169067 | 9/2019 |
| WO | WO 2019236288 | 12/2019 |
| WO | WO 2019246263 | 12/2019 |

OTHER PUBLICATIONS

U.S. Appl. No. 63/031,077, filed May 28, 2020, Zhan et al.
U.S. Appl. No. 63/033,669, filed Jun. 2, 2020, Zhan et al.
"IADC Dull Grading for PDC Drill Bits," Beste Bit, SPE/IADC 23939, 1992, 52 pages.
Akersolutions, "Aker MH CCTC Improving Safety," AkerSolutions, Jan. 2008, 12 pages.
Anwar et al., "Fog computing: an overview of big IoT data analytics," ID 7157192, Wiley, Hindawi, Wireless communications and mobile computing, May 2018, 2018: 1-22, 23 pages.
Artymiuk et al., "The new drilling control and monitoring system," Acta Montanistica Slovaca, Sep. 2004, 9:3 (145-151), 7 pages.
Ashby et al., "Coiled Tubing Conveyed Video Camera and Multi-Arm Caliper Liner Damage Diagnostics Post Plug and Perf Frac," SPE-172622-MS, Society of Petroleum Engineers (SPE), presented at the SPE Middle East Oil & Gas Show and Conference, Mar. 8-11, 2015, 12 pages.
Bilal et al., "Potentials, trends, and prospects in edge technologies: Fog, cloudlet, mobile edge, and micro data centers," Computer Networks, Elsevier, Oct. 2017, 130: 94-120, 27 pages.
Carpenter, "Advancing Deepwater Kick Detection," JPT, 68:5, May 2016, 2 pages.
Caryotakis, "The klystron: A microwave source of surprising range and endurance." The American Physical Society, Division of Plasma Physics Conference in Pittsburg, PA, Nov. 1997, 14 pages.
Commer et al., "New advances in three-dimensional controlled-source electromagnetic inversion," Geophys. J. Int., 2008, 172: 513-535, 23 pages.
Corona et al., "Novel Washpipe-Free ICD Completion With Dissolvable Material," OTC-28863-MS, presented at the Offshore Technology Conference, Houston, TX, Apr. 30-May 3, 2018, 2018, OTC, 10 pages.
Dickens et al., "An LED array-based light induced fluorescence sensor for real-time process and field monitoring," Sensors and Actuators B: Chemical, Elsevier, Apr. 2011, 158:1 (35-42), 8 pages.
Dong et al., "Dual Substitution and Spark Plasma Sintering to Improve Ionic Conductivity of Garnet Li7La3Zr2O12," Nanomaterials, 9:721, 2019, 10 pages.
downholediagnostic.com [online] "Acoustic Fluid Level Surveys," retrieved from URL <https://www.downholediagnostic.com/fluid-level> retrieved on Mar. 27, 2020, available on or before 2018, 13 pages.
edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.

(56) References Cited

OTHER PUBLICATIONS

Fjetland et al., "Kick Detection and Influx Size Estimation during Offshore Drilling Operations using Deep Learning," INSPEC 18992956, IEEE, presented at the 2019 14th IEEE Conference on Industrial Electronics and Applications (ICIEA), Jun. 19-21, 2019, 6 pages.
Gemmeke and Ruiter, "3D ultrasound computer tomography for medical imagining," Nuclear Instruments and Methods in Physics Research Section A:580 (1057-1065), Oct. 1, 2007, 9 pages.
Gryphonoilfield.com [online], "Gryphon Oilfield Services, Echo Dissolvable Fracturing Plug," available on or before Jun. 17, 2020, retrieved on Aug. 20, 2020, retrieved from URL <https://www.gryphonoilfield.com/wp-content/uploads/2018/09/Echo-Series-Dissolvable-Fracturing-Plugs-8-23-2018-1.pdf>, 1 page.
halliburton.com [online], "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, 2014, 64 pages.
Hopkin, "Factor Affecting Cuttings Removal during Rotary Drilling," Journal of Petroleum Technology 19.06, Jun. 1967, 8 pages.
Ji et al., "Submicron Sized Nb Doped Lithium Garnet for High Ionic Conductivity Solid Electrolyte and Performance of All Solid-State Lithium Battery," doi: 10.20944/preprints201912.0307.v1, Dec. 2019, 10 pages.
Johnson et al., "Advanced Deepwater Kick Detection," IADC/SPE 167990, presented at the 2014 IADC/SPE Drilling Conference and Exhibition, Mar. 4-6, 2014, 10 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
King et al., "Atomic layer deposition of TiO2 films on particles in a fluidized bed reactor," Power Technology, 183:3, Apr. 2008, 8 pages.
Lafond et al., "Automated Influx and Loss Detection System Based on Advanced Mud Flow Modeling," SPE-195835-MS, Society of Petroleum Engineers (SPE), presented at the SPE Annual Technical Conference and Exhibition, Sep. 30-Oct. 2, 2019, 11 pages.
Li et al., 3D Printed Hybrid Electrodes for Lithium-ion Batteries, Missouri University of Science and Technology, Washington State University; ECS Transactions, 77 (11) 1209-1218 (2017), 11 pages.
Liu et al., "Flow visualization and measurement in flow field of a torque converter," Mechanic automation and control Engineering, Second International Conference on IEEE, Jul. 15, 2011, 1329-1331.
Liu et al., "Superstrong micro-grained polycrystalline diamond compact through work hardening under high pressure," Appl. Phys. Lett. Feb. 2018, 112: 6 pages.
Liu, et al. "Hardness of Polycrystalline Wurtsite Boron Nitride (wBN) Compacts," Scientific Reports, Jul. 2019, 9(1):1-6, 6 pages.
Luo et al., "Simple Charts to Determine Hole Cleaning Requirements in Deviated Wells," IADC/SPE 27486, SPE/IADC Drilling Conference, Society of Petroleum Engineers, Feb. 15-18, 1994, 7 pages.
Maurer, "The Perfect Cleaning Theory of Rotary Drilling," Journal of Petroleum Technology 14.11, 1962, 5 pages.
Metco, "An Introduction to Thermal Spray," Issue 4, 2013, 24 pages.
nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Nuth, "Smart oil field distributed computing," The Industrial Ethernet Book, Nov. 2014, 85:14 (1-3), 3 pages.
Olver, "Compact Antenna Test Ranges," Seventh International Conference on Antennas and Propagation IEEE, Apr. 15-18, 1991, 10 pages.
Paiaman et al., "Effect of Drilling Fluid Properties on Rate Penetration," Nafta 60:3, 2009, 6 pages.
Parini et al., "Chapter 3: Antenna measurements," in Theory and Practice of Modern Antenna Range Measurements, IET editorial, 2014, 30 pages.
petrowiki.org [online], "Hole Cleaning," retrieved from URL <http://petrowiki.org/Hole_cleaning#Annular-fluid_velocity>, retrieved on Jan. 25, 2019, 8 pages.
petrowiki.org [online], "Kicks," Petrowiki, available on or before Jun. 26, 2015, retrieved on Jan. 24, 2018, retrieved from URL <https://petrowiki.org/Kicks>, 6 pages.
Ranjbar, "Cutting Transport in Inclined and Horizontal Wellbore," University of Stavanger, Faculty of Science and Technology, Master's Thesis, Jul. 6, 2010, 137 pages.
Rasi, "Hole Cleaning in Large, High-Angle Wellbores," IADC/SPE 27464, Society of Petroleum Engineers (SPE), presented at the 1994 SPE/IADC Drilling Conference, Feb. 15-18, 1994, 12 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
Robinson and Morgan, "Effect of Hole Cleaning on Drilling Rate Performance," Paper Aade-04-Df-Ho-42, AADE 2004 Drilling Fluids Conference, Houston, Texas, Apr. 6-7, 2004, 7 pages.
Robinson, "Economic Consequences of Poor Solids and Control," AADE 2006 Fluids Conference and Houston, Texas, Apr. 11-12, 2006, 9 pages.
Rubaii et al., "A new robust approach for hole cleaning to improve rate of penetration," SPE 192223—MS, Society of Petroleum Engineers (SPE), presented at the SPE Kingdom of Saudi Arabia Annual Technical Symposium and Exhibition, Apr. 23-26, 2018, 40 pages.
Ruiter et al., "3D ultrasound computer tomography of the breast: A new era?" European Journal of Radiology 81S1, Sep. 2012, 2 pages.
sageoiltools.com [online] "Fluid Level & Dynamometer Instruments for Analysis due Optimization of Oil and Gas Wells," retrieved from URL <http://www.sageoiltools.com/>, retrieved on Mar. 27, 2020, available on or before 2019, 3 pages.
Schlumberger, "CERTIS: Retrievable, single-trip, production-level isolation system," www.slb.com/CERTIS, 2017, 2 pages.
Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.
Schlumberger, "The Lifting Business," Offshore Engineer, Mar. 2017, 1 page.
Schlumberger, "Zeitecs Shuttle System Decreases ESP Replacement Time by 87%: Customer ESP riglessly retrieved in less than 2 days on coiled tubing," slb.com/zeitecs, 2015, 1 page.
Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.
Schlumberger, "Zeitecs Shuttle: Rigless ESP replacement system," Brochure, 8 pages.
Schlumberger, "Zeitecs Shuttle: Rigless ESP replacement system," Schlumberger, 2017, 2 pages.
Sifferman et al., "Drilling cutting transport in full scale vertical annuli," Journal of Petroleum Technology 26.11, 48th Annual Fall Meeting of the Society of Petroleum Engineers of AIME, Las Vegas, Sep. 30-Oct. 3, 1973, 12 pages.
slb.com [online] "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.
slb.com [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.
Sulzer Metco, "An Introduction to Thermal Spray," 4, 2013, 24 pages.

(56) References Cited

OTHER PUBLICATIONS

Takahashi et al., "Degradation study on materials for dissolvable frac plugs," URTeC 2901283, presented at the Unconventional Resources Technology Conference, Houston, Texas, Jul. 23-25, 2018, 9 pages.

tervesinc.com [online], "TERVALLOY™ Degradable Magnesium Alloys," available on or before Jun. 12, 2016, via Internet Archive: Wayback Machine URL <https://web.archive.org/web/20160612114602/http://tervesinc.com/media/Terves_8-Pg_Brochure.pd>, retrieved on Aug. 20, 2020, <http://tervesinc.com/media/Terves_8-Pg_Brochure.pdf>, 8 pages.

Thefreedictionary.com [online], "Paddle", Jan. 2004, [retrieved on Apr. 12, 2021], retrieved from: URL <https://www.thefreedictionary.com/paddle>, 8 pages.

Tobenna, "Hole Cleaning Hydraulics," Universitetet o Stavanger, Faculty of Science and Technology, Master's Thesis, Jun. 15, 2010, 75 pages.

Utkin et al., "Shock Compressibility and Spallation Strength of Cubic Modification of Polycrystalline Boron Nitride," High Temperature, 2009, 47(5):628-634, 7 pages.

Wastu et al., "The effect of drilling mud on hole cleaning in oil and gas industry," Journal of Physics: Conference Series, Dec. 2019, 1402:2, 7 pages.

Weatherford, "RFID Advanced Reservoir Management System Optimizes Injection Well Design, Improves Reservoir Management," Weatherford.com, 2013, 2 pages.

Wei et al., "The Fabrication of All-Solid-State Lithium-Ion Batteries via Spark Plasma Sintering," Metals, 7: 372, 2017, 9 pages.

Wellbore Service Tools: Retrievable tools, "RTTS Packer," Halliburton: Completion Tools, 2017, 4 pages.

wikipedia.org [online] "Optical Flowmeters," retrieved from URL <https://en.wikipedia.org/wiki/Flow_measurement#Optical_flowmeters>, retrieved on Mar. 27, 2020, available on or before Jan. 2020, 1 page.

wikipedia.org [online] "Ultrasonic Flow Meter," retrieved from URL <https://en.wikipedia.org/wiki/Ultrasonic_flow_meter>, retrieved on Mar. 27, 2020, available on or before Sep. 2019, 3 pages.

wikipedia.org [online], "Atomic layer deposition," available on or before Sep. 10, 2014, via Internet Archive: Wayback Machine URL <http://web.archive.org/web/20140910101023/http://en.wikipedia.org/wiki/Atomic_layer_deposition>, retrieved on Feb. 9, 2021, <https://en.wikipedia.org/wiki/Atomic_layer_deposition>.

wikipedia.org [online], "Chemical vapor deposition," available on or before Apr. 11, 2013, via Internet Archive: Wayback Machine URL <http://web.archive.org/web/20130411025512/http://en.wikipedia.org:80/wiki/Chemical_Vapor_Deposition>, retrieved on Feb. 9, 2021, URL <https://en.wikipedia.org/wiki/Chemical_vapor_deposition>, 12 pages.

wikipedia.org [online], "Surface roughness," retrieved from URL <https://en.wikipedia.org/wiki/Surface_roughness>, retrieved on Apr. 2, 2020, available on or before Oct. 2017, 6 pages.

Williams and Bruce, "Carrying Capacity of Drilling Muds," Journal of Petroleum Technology, 3.04, 192, 1951, 10 pages.

Xia et al., "A Cutting Concentration Model of a Vertical Wellbore Annulus in Deep-water Drilling Operation and its Application," Applied Mechanics and Materials, 101-102, Sep. 27, 2011, 5 pages.

Xue et al., "Spark plasma sintering plus heat-treatment of Ta-doped Li7La3Zr2O12 solid electrolyte and its ionic conductivity," Mater. Res. Express 7 (2020) 025518, 8 pages.

Zhan et al. "Effect of $\beta$-to-$\alpha$ Phase Transformation on the Microstructural Development and Mechanical Properties of Fine-Grained Silicon Carbide Ceramics," Journal of the American Ceramic Society 84.5, May 2001, 6 pages.

Zhan et al. "Single-wall carbon nanotubes as attractive toughening agents in alumina-based nanocomposites," Nature Materials 2.1, Jan. 2003, 6 pages.

Zhan et al., "Atomic Layer Deposition on Bulk Quantities of Surfactant Modified Single-Walled Carbon Nanotubes," Journal of American Ceramic Society, 91:3, Mar. 2008, 5 pages.

Zhang et al., "Increasing Polypropylene High Temperature Stability by Blending Polypropylene-Bonded Hindered Phenol Antioxidant," Macromolecules, 51:5 (1927-1936), 2018, 10 pages.

Zhu et al., "Spark Plasma Sintering of Lithium Aluminum Germanium Phosphate Solid Electrolyte and its Electrochemical Properties," University of British Columbia; Nanomaterials, 9, 1086, 2019, 10 pages.

\* cited by examiner

REPAIRING A CASED WELLBORE

FIELD OF THE DISCLOSURE

This disclosure relates to wellbores, in particular, to wellbore repairing tools.

BACKGROUND OF THE DISCLOSURE

Wellbores have metal casings to protect the wellbore from formation fluids and to withstand a variety of forces, such as collapse, burst, and tensile fatigue. The casing can be placed on a wellbore by cementing the casing to a wall of the wellbore. During drilling or production operations, the integrity of the casing can be compromised due to tool damage, downhole temperatures and pressures, corrosion, and other related issues. A compromised casing can include casing leaks, lost circulation, cementing defect, corrosion, and formation rock instability. Methods and equipment for repairing wellbore casing are sought.

SUMMARY

Implementations of the present disclosure include a repairing assembly that includes a housing, a packer, and a thermal spray assembly. The housing is attached to a wellbore string disposed within a wellbore that includes a casing. The packer is coupled to the housing. The packer is set on a wall of the wellbore to bound a repair zone defined between the packer and an end of the housing opposite the packer. The housing or the packer includes a fluid channel in fluid communication with the wellbore string or an annulus of the wellbore. The thermal spray assembly is coupled to the housing. The thermal spray assembly sprays a damaged section of the casing with a thermal spray to repair the damaged section. The housing flows an inert gas received from the wellbore string or the annulus of the wellbore and through the fluid channel into the repair zone until an oxygen in the repair zone is substantially removed from the repair zone.

In some implementations, the repairing assembly further includes a sensor coupled to the housing and communicatively coupled to a processor configured to receive location information from the sensor. The processor determines, based on the location information, a location of the damaged section of the casing. In some implementations, the repairing assembly further includes a controller coupled to the thermal spray assembly. The processor transmits thermal spray instructions to the controller and the controller actuates, based on the instructions, the thermal spray assembly.

In some implementations, the controller is operationally coupled to a fluid pump in fluid communication with the fluid channel of the housing. The controller actuates, based on pump instructions received from the processor, the fluid pump, flowing the inert gas into the fluid channel thereby setting the packer and substantially removing the oxygen from the repair zone. In some implementations, the thermal spray assembly includes an energy source and a powder source disposed at or near a fluid outlet of the fluid channel. The controller actuates the fluid pump, flowing the inert gas with the thermal spray during thermal spraying of the thermal spray assembly.

In some implementations, the repairing assembly further includes a second packer disposed downhole of the packer. The repair zone is defined between the packer and the second packer. The fluid channel resides at the packer and receives the inert gas from the annulus of the wellbore. The packer includes a fluid outlet that flows the oxygen out of the repair zone as the inert gas is flown into the repair zone through the fluid channel.

In some implementations, the repairing assembly further includes a second packer disposed downhole of the packer. The repair zone is defined between the packer and the second packer. The fluid channel resides at the housing. The fluid channel is arranged to direct the inert gas to an internal surface of the packer, an internal surface of the second packer, and to the repair zone. The repairing assembly further includes a first valve disposed at the internal surface of the packer, a second valve disposed at the internal surface of the second packer, and a third valve disposed at a fluid outlet of the fluid channel. The first, second, and third valves are operationally coupled to the controller. The controller controls the valves, regulating a flow of inert gas along the fluid channel and selectively setting the packer, the second packer, and injecting fluid into the repair zone.

Implementations of the present disclosure include a method of repairing a damaged casing. The method includes receiving, by a processor and from one or more sensors coupled to a repairing assembly disposed within a wellbore, wellbore information. The method includes determining, by the processor and based on the wellbore information, a location of a damaged section of a casing of the wellbore. The method includes transmitting, by the processor and to a controller communicatively coupled to the processor, thermal spray instructions. The thermal spray instructions usable by the controller to actuate a thermal spray assembly of the repairing assembly, thereby spraying the damaged section with a thermal spray and repairing the damaged section.

In some implementations, the method further includes, before transmitting the thermal spray instructions, transmitting, by the processor and to the controller, pump instructions. The pump instructions usable by the controller to actuate a fluid pump in fluid communication with the repairing assembly and flow an inert gas into a repair zone at the damaged section of the casing, substantially removing an oxygen from the repair zone. In some implementations, the pump instructions are usable by the controller to actuate the fluid pump and flow the inert gas into a first packer of the repair assembly, setting the first packer on a wall of the wellbore. The repair zone is defined between the first packer and an end of the repair assembly opposite the first packer. In some implementations, the pump instructions are usable by the controller to actuate the fluid pump and flow the inert gas into a second packer of the repair assembly disposed downhole of the first packer. The flow of inert gas into the second packer sets the second packer on the wall of the wellbore. The repair zone is defined between the first packer and the downhole packer.

Implementations of the present disclosure include a method of repairing a damaged section of a wellbore. The method includes deploying a repairing assembly to a repair zone of a casing of the wellbore, the repair zone including a damaged section of the casing at a downhole location of the wellbore. The method also includes substantially removing an oxygen from the repair zone. The method also includes depositing a thermal spray on the damaged section, repairing the damaged section of the wellbore.

In some implementations, the method further includes, before removing the oxygen from the repair zone, locating, based on data received from one or more sensors of the repairing assembly, the damaged section.

In some implementations, substantially removing an oxygen from the repair zone includes injecting an inert gas into the repair zone, removing at least one of the oxygen, a production fluid, or a wellbore fluid from the repair zone. In some implementations, the repairing assembly includes a fluid outlet and a packer, and substantially removing the oxygen from the repair zone includes setting the packer on a wall of the wellbore and injecting the inert gas into the repair zone, flowing the oxygen through the fluid outlet out of the repair zone.

In some implementations, the repairing assembly further includes a thermal spray gun and a second packer disposed downhole of the packer. The thermal spray gun is disposed between the packer and the second packer. The repair zone is defined between the packer and the second packer. Substantially removing the oxygen from the repair zone includes setting the second packer on the wall of the wellbore, preventing oxygen, production fluid, and wellbore fluid from entering the repair zone from a downhole wellbore zone disposed downhole of the repair zone. In some implementations, the repairing assembly further includes a supply fluid channel configured to direct the inert gas to an internal surface of the packer, an internal surface of the second packer, and to the repair zone. In such implementations, the method further includes, after deploying the repairing assembly to the repair zone, flowing the inert gas to the internal surface of the packer, setting the packer on the wall of the wellbore, and flowing the inert gas to the internal surface of the second packer, setting the second packer on the wall of the wellbore. In some implementations, the supply fluid channel directs the inert gas to a fluid outlet of the thermal spray gun, and depositing the thermal spray includes depositing the thermal spray with the inert gas.

In some implementations, the thermal assembly includes a first packer and a second packer disposed adjacent the first packer, and substantially removing the oxygen from the repair zone includes pushing, by a compressed inert gas flown into the repair zone, the second packer away from the first packer, and forming a seal between the second packer and the wall of the wellbore.

In some implementations, depositing the thermal spray includes delivering, at the damaged section, an energy source and powder simultaneously.

DETAILED DESCRIPTION OF THE DISCLOSURE

The present disclosure describes a repairing assembly that has a thermal spray nozzle to repair damaged sections of a wellbore casing. The repairing assembly can be deployed to a downhole location where sensors of the repairing assembly detect the damaged area. The repairing assembly prepares the working area by squeezing oxygen and other wellbore fluids from a repair zone where the thermal spray is to be deposited. The thermal spray can be delivered with a plasma spray or with a laser beam spray to coat or weld the damaged area. The thermal spray gun delivering the thermal spray can move to cover a large area of the casing.

Particular implementations of the subject matter described in this specification can be implemented so as to realize one or more of the following advantages. For example, the repairing assembly of the present disclosure can repair a wellbore casing in one trip. Additionally, the repairing assembly can reach downhole locations under harsh conditions. Additionally, the repairing assembly of the present disclosure can repair the wellbore casing without reducing an internal diameter of the casing and without reducing a pressure rating of the casing.

Figure 1:
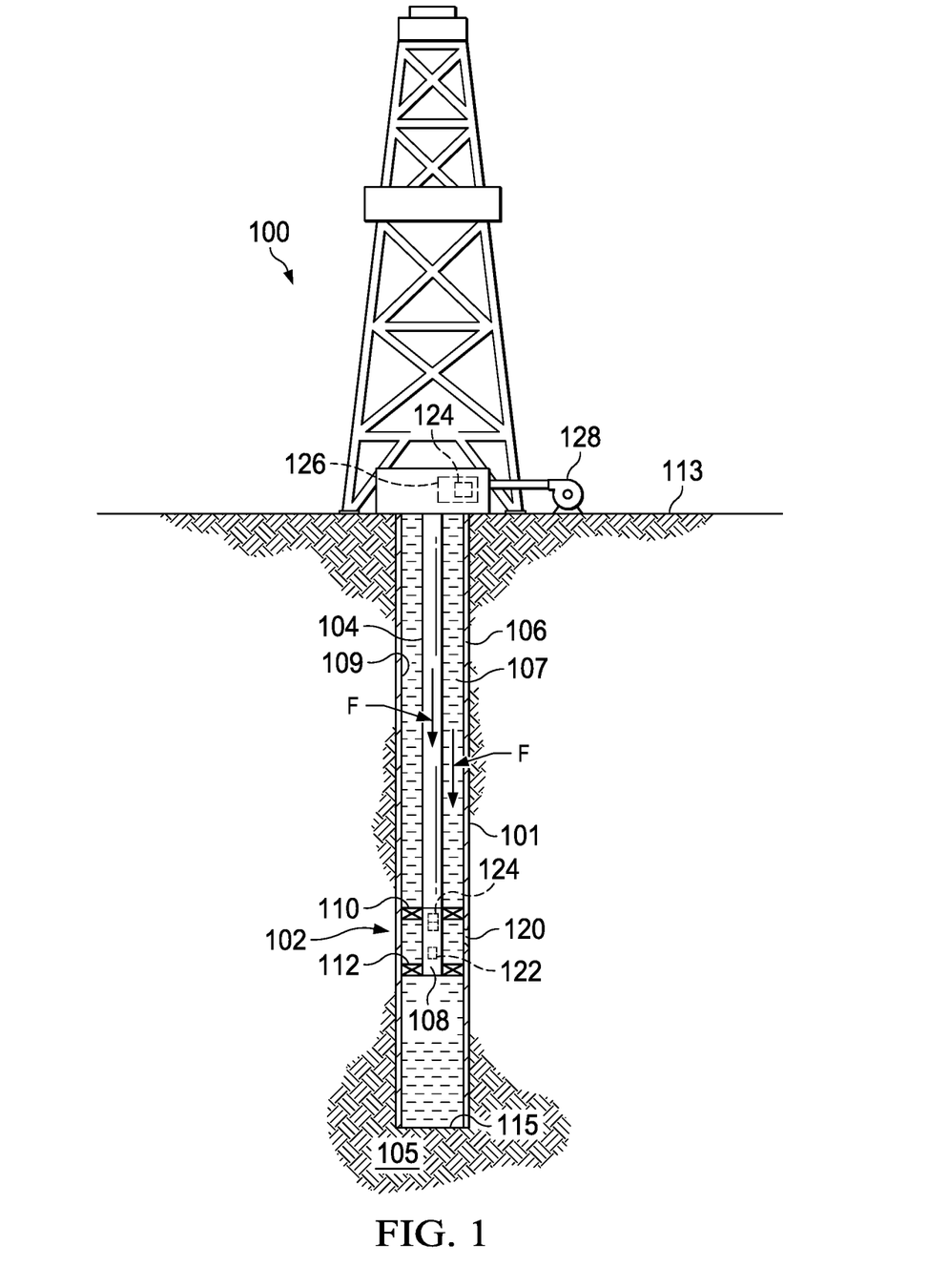
FIG. 1 is a front schematic view of a wellbore assembly according to implementations of the present disclosure.

FIG. 1 shows a wellbore assembly 100 implemented in a wellbore 101 formed in a geologic formation 105. The geologic formation 105 can include a hydrocarbon reservoir from which hydrocarbons can be extracted. The wellbore 101 extends from a surface 113 (e.g., a ground surface) of the wellbore 101 to a downhole end 115 of the wellbore 101. The wellbore 101 has a casing 106 that can be damaged. For example, the casing 106 can have a damaged section 120 that includes, for example, holes, cracks, or rust.

The wellbore assembly 100 includes a wellbore string 104 (e.g., a production string, a drill string, or coiled tubing) and a repairing assembly 102 connected to a downhole end of the wellbore string 104. The wellbore string 104 can form, with a wall 109 of the wellbore 101, a wellbore annulus 107. The wellbore annulus 107 is defined between an external surface of the wellbore string 101 and the wall 109 of the wellbore 101. The repairing assembly 102 can include a housing 108, a first packer 110, and a second packer 112. The wellbore annulus 107 is also defined between an external surface of the housing 108 and the wall 109 of the wellbore 101.

The repairing assembly 102 can also include a sensor system 122 (e.g., a sensor or group of sensors) that detect or sense the damaged section 120 of the casing 106. For example, the sensor system 122 can include an imaging or scanning system. The sensor system 122 can also include an acoustic emission system, an ultrasonic scanning system, or an electric resistance measurement system. The sensor 122 is attached to the housing 108 and is communicatively coupled to the processor 124. The processor 124 receives location information from the sensor and determines, based on the location information, a location of the damaged section of the casing.

The wellbore assembly 100 can also include a fluid pump 128 that flows fluid 'F' (e.g., a compressed inert gas) to the repairing assembly 102. The fluid pump 128 can be disposed at the surface 113 of the wellbore 101 or inside the wellbore 101, such as near the repairing assembly 102. The fluid pump 128 is in fluid communication with the repairing assembly 102 to flow fluid 'F' to the repairing assembly through the wellbore string 104 or through an annulus 107 of the wellbore. For example, if the wellbore string 104 is in fluid communication with the repairing assembly 102, the fluid pump 128 can flow the fluid 'F' through the wellbore string 104 to the repairing assembly 102. If the wellbore annulus 107 is in fluid communication with the repairing assembly 102, the fluid pump 128 can flow the fluid 'F' through the wellbore annulus 107 to the repairing assembly 102.

The wellbore assembly 100 can also include a processing device 124 (e.g., a computer processor) and a controller 126. Each of the processor 124 and the controller 126 are communicatively coupled to the repairing assembly 102. For example, the processor 124 and the controller 126 can be part of the repairing assembly 102 or, as shown in dashed lines, can reside at or near the surface 113 of the wellbore 101.

The controller 126 can be coupled to multiple components of the repairing assembly 102. In some implementations, the controller 126 can be disposed within the wellbore, for example, in the annulus 107 or on the wellbore string 104. In some implementations, the controller 126 can include a processing device and receive the information directly from the sensors 122. The controller 126 can be implemented as a distributed computer system disposed partly at the surface and partly within the wellbore 101. The computer system can include one or more processors (e.g., the processor 124) and a computer-readable medium storing instructions executable by the one or more processors to perform the operations described here. In some implementations, the controller 126 can be implemented as processing circuitry, firmware, software, or combinations of them. The controller 126 can transmit signals to the fluid pump 128 and the repairing assembly 102 to repair the wellbore casing 106.

Figure 2:
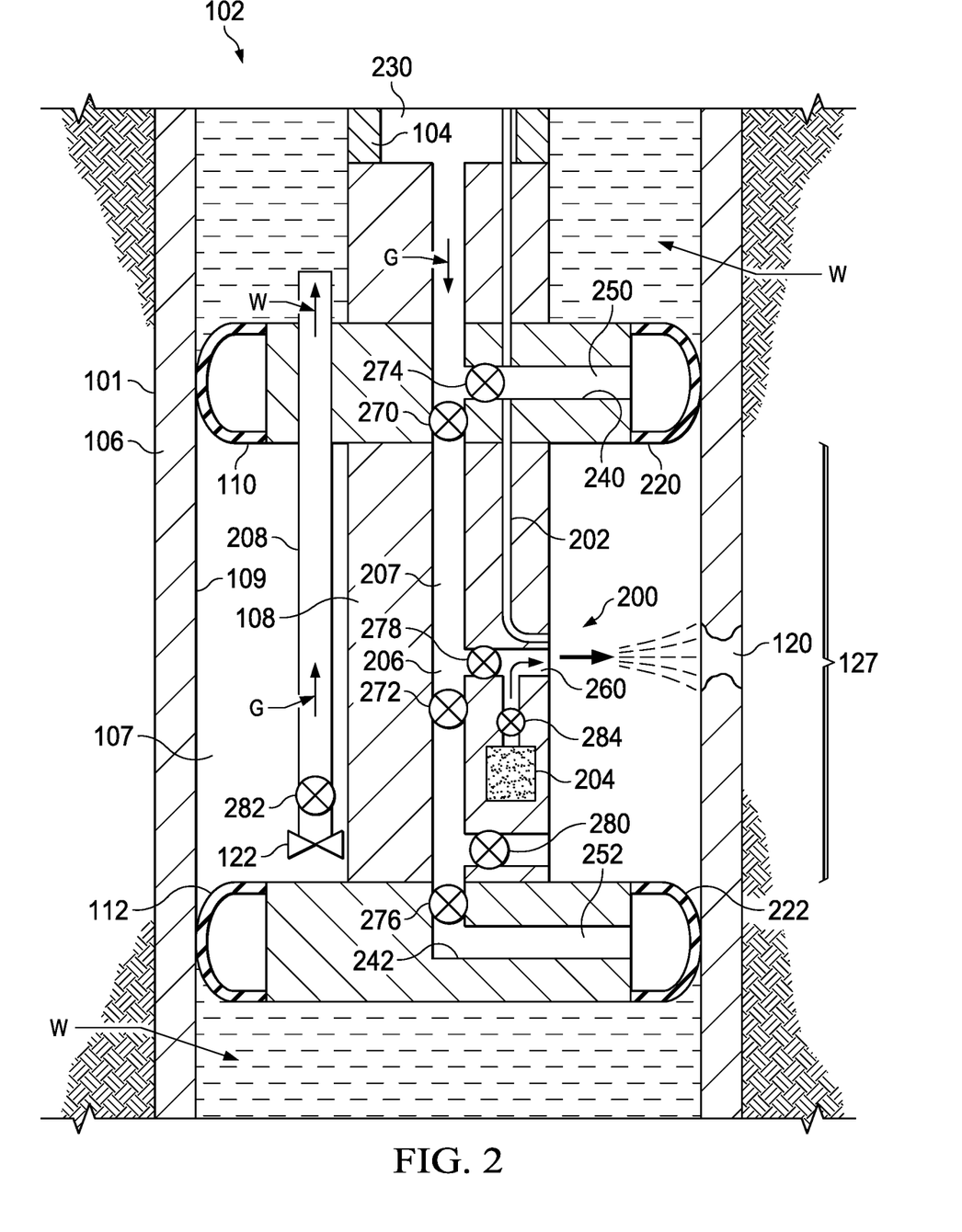
FIG. 2 is a front schematic view, cross sectional, of a repairing assembly according to a first implementation of the present disclosure.

FIG. 2 shows an implementation of the repairing assembly 102 according to a first implementation of the present disclosure. The repairing assembly 102 includes two packers 110 and 112 attached to the housing 108, a sensor 122 (e.g., an imaging sensor), and a thermal spray gun 200. The first packer 110 is attached to the housing 108. The first packer 110 and the second packer 112 are arranged to be set on the wall 109 of the wellbore casing 106. For example, each of the first and second packers 110 and 112 include a respective rubber element 220 and 222 that expands or moves toward the wall 109 to form a fluid-thigh seal with the wall 109 between the rubber element and the wall 109. Each packer 110 and 112 can also include an anchor or slips to engage the wall 109 of the wellbore casing 106.

The second packer 112 resides at an end of the repair assembly opposite the first packer 110. For example, the second packer 112 is disposed downhole of the first packer 112, with the thermal spray 200 disposed between the two packers 110 and 112. The packers 110 and 112 bound a repair zone 127 that is defined between the first packer 110 and the second packer 112. In other words, the repair zone 127 can be the annulus of the wellbore defined between an external surface of the housing 108 and the wall 109 of the wellbore 101, and between the first packer 110 and the second packer 112. In some implementations and as further described in detail below with respect to FIGS. 3-5, the first packer 110 can include a fluid channel that receives fluid that is injected into the repair zone 127 to remove oxygen from the repair zone 127.

The housing 108 has an internal fluid channel 206 that is in fluid communication with the wellbore string 104. For example, the wellbore string 104 has a bore 230 that flows fluid into the internal fluid channel 206 of the housing 108. The fluid channel 206 directs the inert gas "G" to the thermal spray gun 200, to an internal surface 240 of the first packer 110, to an internal surface 242 of the second packer 112, and to the repair zone 127. For example, the fluid channel 206 includes a central channel 207, a first packer channel 250 extending from the central channel 207, a second packer channel 252 extending from the central channel 207, and a thermal spray gun channel 260 extending from the central channel 207. The inert gas "G' flows into the first packer channel 250 to actuate (e.g., expand or bias) the rubber element 220 to set the first packer 110 on the wall 109. Similarly, the inert gas "G' flows into the second packer channel 252 to actuate (e.g., expand or bias) the rubber element 222 to set the second packer 112 on the wall 109.

The repairing assembly 102 has multiple valves to regulate the flow of the inert gas "G" along the fluid channel 206. For example, the repairing assembly 102 includes a first central valve 270 disposed at the central cannel 207 between the first packer channel 250 and the spray gun channel 260. The repairing assembly 102 also includes a second central valve 272 disposed at the central cannel 207 between the spray gun channel 260 and the second packer channel 252. The repairing assembly 102 also includes a first packer valve 274 disposed at the first packer channel 250 and a second packer valve 276 disposed at the second packer channel 252. The repairing assembly 102 also includes a spray gun valve 278 disposed at the spray gun channel 260, a repair zone valve 280 disposed at a fluid outlet of the housing 108, an outlet valve 282 disposed at an outlet channel 208 of the repairing assembly 102, and a powder valve 284 disposed at a powder reservoir 204 of the repairing assembly 102. Each of the valves can be connected to the controller 126 (see FIG. 1) to be controlled by the controller 126.

Before spraying the thermal spray, the controller 126 can control the valves and the fluid pump to set the packer and remove the oxygen from the repair zone 127. For example, the fluid channel 206 flows the inert gas "G" into the repair zone 127 until all the undesirable fluids 'W' are removed from the repair zone 127. The undesirable fluids 'W' can include oxygen, production fluid (e.g., hydrocarbons). Wellbore fluids (e.g., water) and any other fluids in the wellbore that are flammable or that can interrupt the thermal spraying process of the repairing assembly 102.

The injection of the inert gas 'G' can substantially remove the oxygen and other fluids from the repair zone. In some implementations, substantially removing the undesirable fluid 'W' includes removing an amount of undesirable fluids 'W' from the repair zone 127 enough to prevent ignition at the repair zone during thermal spraying using the energy source 202.

The thermal spray assembly 200 is arranged to spray the damaged section 120 of the casing 106 to repair the damaged section 120. For example, the thermal spray assembly 200 can be a thermal spray gun that includes an energy source 202 and a powder source 204. The energy source 202 and the powder source 204 can be disposed at or near a fluid outlet 290 of the spray gun channel 260. The energy source 202 can be a plasma or a laser or any energy source capable of delivering energy without oxygen. The powder source 204 can be a metallic powder. The controller 126 can actuate the energy source 202 and the powder source 205 to deposit the powder and energy source at the same time on the damaged section 127 of the casing 106. For example, depositing the thermal spray includes delivering, at the damaged section 127, the energy source and powder simultaneously. The thermal spray can cover, for example, a 12-inch length vertically, and cover about 120° of the casing. In some implementations, the thermal spray assembly 200 can rotate without unsetting the packers 110 and 112. For example, the housing 108 can rotate with respect with the packers to position the thermal spray gun at a desired location of the repair zone 127.

Referring to FIGS. 1 and 2, the controller 126 can actuate the fluid pump 128, the valves, and the thermal spray assembly 200. The controller 126 can actuate the pump 128 to pressurize different fluid channels of the repairing assembly 102. For example, to set the second packer 112, the actuator can open the second packer valve 276, the central valves 270 and 272, and close the rest of the valves to pressurize the second packer 112 and set the second packer 112 on the wall 109. To set the first packer 110, the controller 126 can close the at least one of the central valves 270 and 272 and open the first packer valve 274 to pressurize the first packer 110 and set the first packer 110 on the wall 109. To displace or remove the undesirable fluids 'W' from the repair zone 127, the controller 126 can open the central valves 270 and 272, the repair zone valve 280, and the outlet valve 282, close the rest of the valves, and flow the inert gas into the repair zone 127 and out the repair zone through the outlet channel 208. After substantially removing the undesirable fluids 'W', the controller 126 can actuate the thermal spray assembly 200. For example, the controller 126 close the second central valve 272 and open the spray gun valve 278 and powder valve 284. The controller 126 can then simultaneously start the power line (e.g., the energy source 202 and the powder source 204) to deliver the energy source and the powder with the inert gas simultaneously.

The processor 124 can send instructions, based on data gathered by the sensor 122, to the controller 126. For example, the sensor can transmit wellbore information to the controller 126 representing location data, and the processor 124 can process the sensor data to determine an exact location of the damaged section 120. Based on the location, the repairing assembly 102 can be deployed to the right location of the wellbore 101. The processor 124 can also transmit thermal spray instructions (e.g., a start command) to the controller 126 and the controller can actuate, based on the instructions, the thermal spray assembly 200. Additionally, the controller 126 can actuate, based on pump instructions received from the processor 124, the fluid pump 128 to flow the inert gas into the fluid channel thereby setting the packers and substantially removing the oxygen from the repair zone 127.

Figure 3:
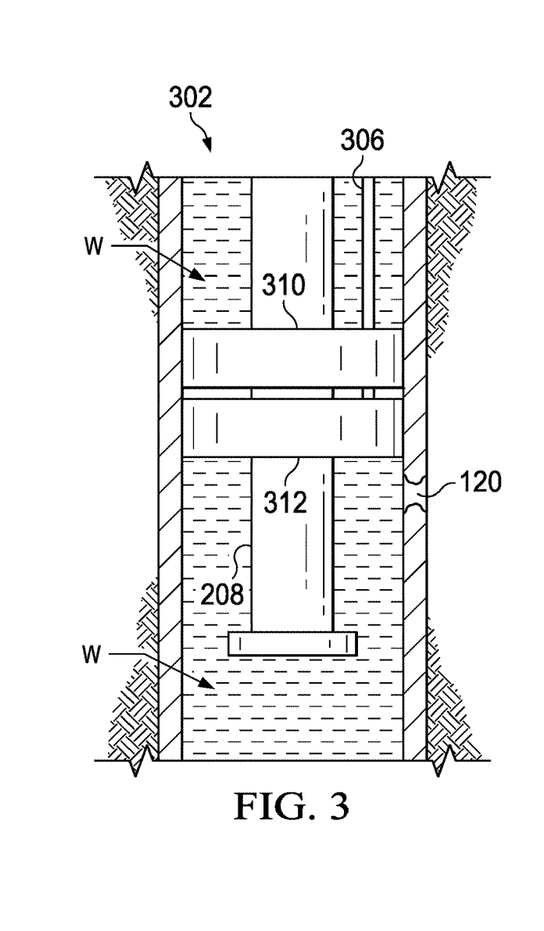
FIGS. 3-4 are front schematic views, cross sectional, of sequential steps to repair a wellbore casing with a repairing assembly according to a second implementation of the present disclosure
Figure 4:
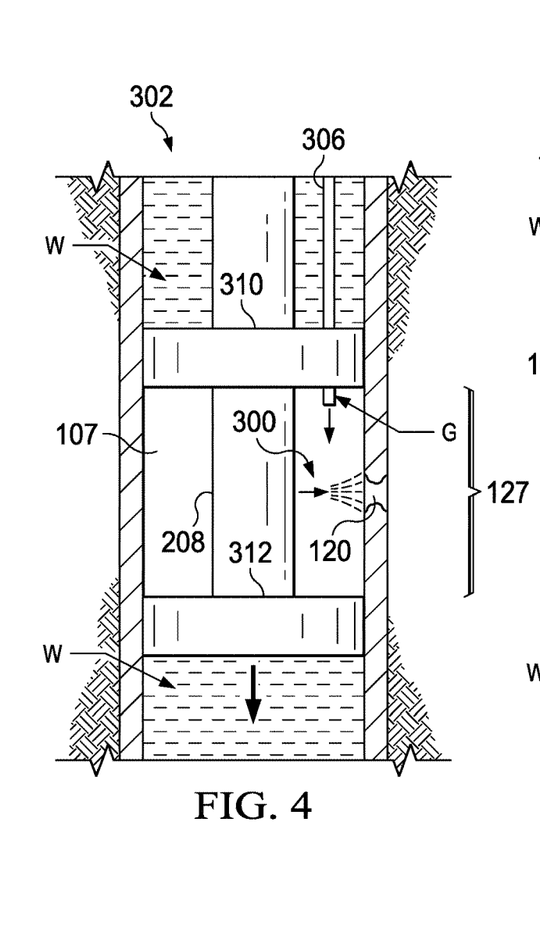

FIGS. 3 and 4 show sequential steps for repairing the damaged section 120 with a repairing assembly 302 according to a second implementation of the present disclosure. The repairing assembly 302 includes a first packer 310, a second packer 312, a housing 308, and a thermal spray assembly 300. The repairing assembly 302 can be similar to the repairing assembly 102 in FIG. 2, with the main exception that at least one of the packers is movable and that the inert gas is injected through the first packer. For example, the packers 310 and 312 can be set mechanically, electrically, or by fluidic pressure, as described above with respect to FIG. 2. The thermal spray assembly 300 can be actuated similar to the thermal spray assembly of FIG. 2.

To isolate the repair zone 127, the packers 310 and 312 can be deployed within the wellbore together or substantially close to each other. At the desired location, the packers can be set and the second packer 312 can be pushed by a compressed gas (e.g., an inert gas) injected into the repair zone 127 through a fluid inlet channel 306, away from the first packer 310. Pushing the second packer 312 can push the unwanted fluids 'W' downhole, away from the repair zone 127. For example, the second packer 312 is set on the wall of the wellbore, and then the gas injected between the two packers, generating a differential pressure by inert gas sufficient to releasing the packer slipper from the wall and move the packer. In some implementations, the packer slipper can be released first and then the gas injected to move the packer.

The fluid inlet channel 306 can extend through the first packer 310. The fluid inlet channel 306 is in fluid communication with a section of the wellbore annulus 107 uphole of the first packer 310. The pump can flow the inert gas from the annulus of the wellbore to the fluid inlet channel 306.

Figure 5:
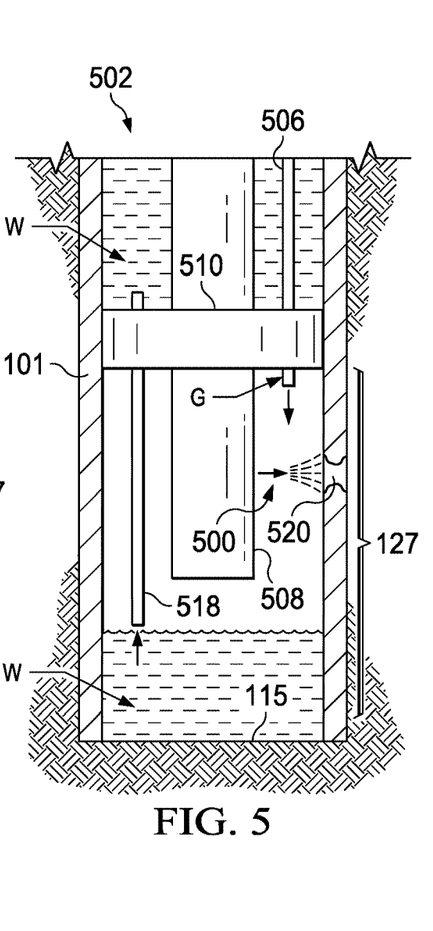
FIG. 5 is a front schematic view, cross sectional, of a repairing assembly according to a third implementation of the present disclosure.

FIG. 5 depicts a repairing assembly 502 according to a third implementation of the present disclosure. The repairing assembly 502 is similar to the repairing assembly 302 in FIGS. 3-4, with the main exception that the repairing assembly 502 has one packer and a fluid inlet and a fluid outlet. For example, the packer 510 be set mechanically, electrically, or by fluidic pressure, as described above with respect to FIG. 2. The thermal spray assembly 500 can be actuated similar to the thermal spray assembly of FIG. 2.

The packer 510 has a fluid inlet 506 (e.g., an inlet pipe) and a fluid outlet 518 (e.g., an outlet pipe), both in fluid communication with a section of the wellbore annulus 107 uphole of the packer 510. The repair zone 127 can extend from the packer 510 to the downhole end 115 of the wellbore 101. To isolate the repair zone 127, the pump flows the compressed inert gas into the repair zone through the fluid inlet 506 and out through the fluid outlet 518 until all or substantially all of the wellbore fluids and oxygen are removed from the repair zone 127. In some implementations, the fluid inlet 506 and the fluid outlet 518 can be part of or disposed inside the wellbore string 104.

Figure 6:
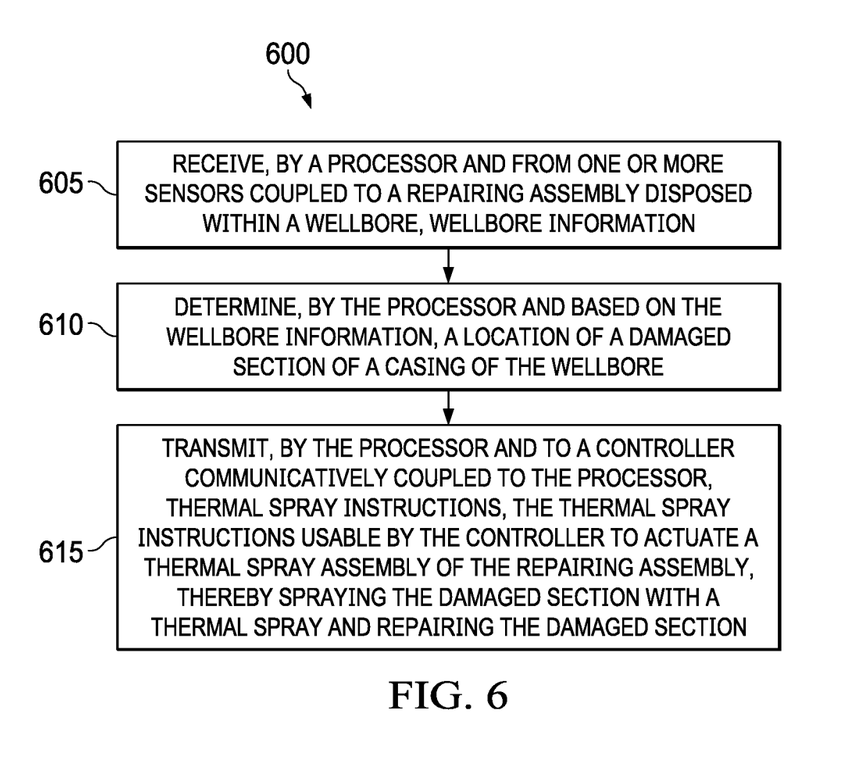
FIG. 6 is a flow chart of an example method of repaying a damaged casing section according to a first implementation of the present disclosure.

FIG. 6 shows a flow chart of an example method 600 of repairing a damaged section of a wellbore casing. The method includes receiving, by a processor and from one or more sensors coupled to a repairing assembly disposed within a wellbore, wellbore information (605). The method also includes determining, by the processor and based on the wellbore information, a location of a damaged section of a casing of the wellbore (610). The method also includes transmitting, by the processor and to a controller communicatively coupled to the processor, thermal spray instructions. The thermal spray instructions are usable by the controller to actuate a thermal spray assembly of the repairing assembly, thereby spraying the damaged section with a thermal spray and repairing the damaged section (615).

Figure 7:
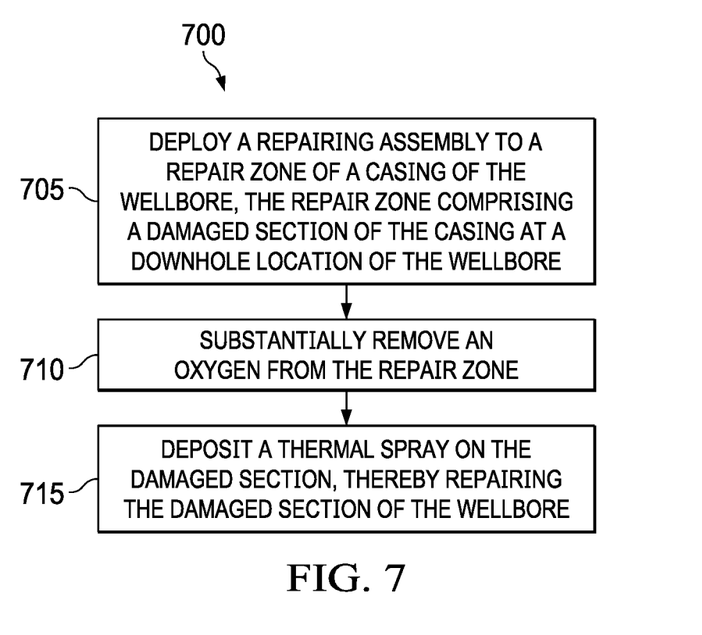
FIG. 7 is a flow chart of an example method of repaying a damaged casing section according to a second implementation of the present disclosure.

FIG. 7 shows a flow chart of an example method 700 of repairing a damaged section of a wellbore casing. The method includes deploying a repairing assembly to a repair zone of a casing of the wellbore, the repair zone including a damaged section of the casing at a downhole location of the wellbore (705). The method also includes substantially removing an oxygen from the repair zone (710). The method also includes depositing a thermal spray on the damaged section, thereby repairing the damaged section of the wellbore (715).

Figure 8:
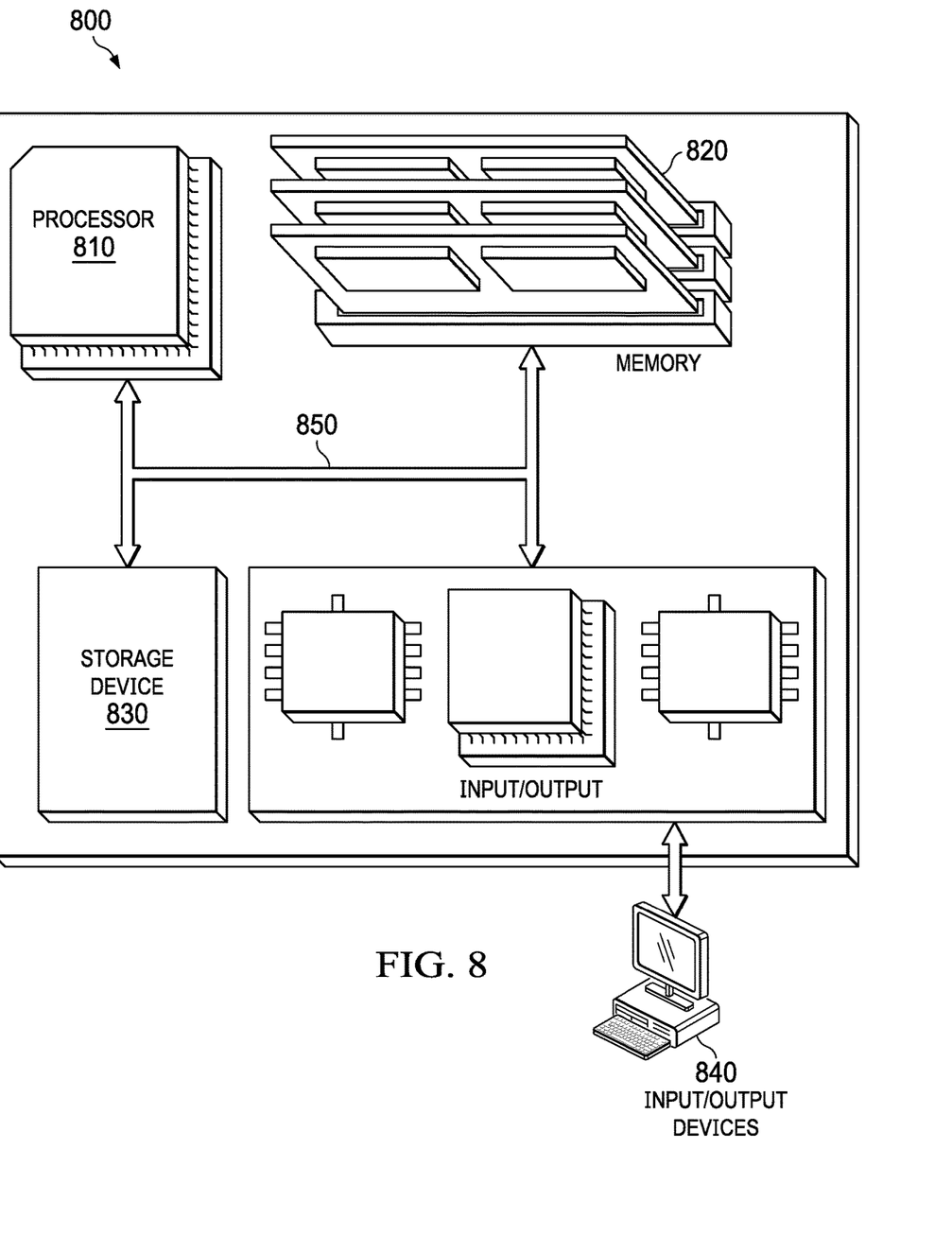
FIG. 8 is a schematic illustration of an example control system or controller for a repairing assembly according to the present disclosure.

FIG. 8 is a schematic illustration of an example control system or controller for a repairing assembly according to the present disclosure. For example, the controller 800 may include or be part of the controller 126 and processor 124 shown in FIG. 1. The controller 800 is intended to include various forms of digital computers, such as printed circuit boards (PCB), processors, digital circuitry, or otherwise. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 800 includes a processor 810, a memory 820, a storage device 830, and an input/output device 840. Each of the components 810, 820, 830, and 840 are interconnected using a system bus 850. The processor 810 may include or be part of the processor 124 shown in FIGS. 1-4, and is capable of processing instructions for execution within the controller 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the controller 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the controller 800. In one implementation, the storage device 830 is a computer-readable medium. In various different implementations, the storage device 830 may be a floppy disk device, a hard disk device, an optical disk device, or a tape device.

The input/output device 840 provides input/output operations for the controller 800. In one implementation, the input/output device 840 includes a keyboard and/or pointing device. In another implementation, the input/output device 840 includes a display unit for displaying graphical user interfaces.

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A repairing assembly comprising:
    a housing configured to be attached to a wellbore string configured to be disposed within a wellbore comprising a casing, the housing comprising a fluid channel in fluid communication with the wellbore string or an annulus of the wellbore;
    a first packer coupled to the housing, the first packer configured to be set on a wall of the wellbore;
    a second packer disposed downhole of the first packer and configured to be set on a wall of the casing to bound, with the first packer set on the wall of the casing, a repair zone defined between the first packer and the second packer, the first packer comprising a fluid outlet configured to flow the oxygen out of the repair zone as an inert gas is flown into the repair zone through the fluid channel, substantially removing the oxygen from the repair zone; and
    a thermal spray assembly coupled to the housing and residing between the first packer and the second packer, the thermal spray assembly configured to spray, with a thermal spray, a damaged section of the casing in the repair zone absent oxygen to repair the damaged section.

2. The repairing assembly of claim 1, further comprising a sensor coupled to the housing and communicatively coupled to a processor configured to receive location information from the sensor, the processor configured to determine, based on the location information, a location of the damaged section of the casing.

3. The repairing assembly of claim 2, further comprising a controller coupled to the thermal spray assembly, the processor configured to transmit thermal spray instructions to the controller and the controller configured to actuate, based on the instructions, the thermal spray assembly.

4. The repairing assembly of claim 2, wherein the controller is operationally coupled to a fluid pump in fluid communication with the fluid channel of the housing, the controller configured to actuate, based on pump instructions received from the processor, the fluid pump and flow the inert gas into the fluid channel thereby setting the first packer and substantially removing the oxygen from the repair zone.

5. The repairing assembly of claim 4, wherein the thermal spray assembly comprises an energy source and a powder source disposed at or near a fluid outlet of the fluid channel, the controller configured to actuate the fluid pump, thereby flowing the inert gas with the thermal spray during thermal spraying of the thermal spray assembly.

6. The repairing assembly of claim 5, wherein the thermal spray assembly is configured to deliver the energy source and a powder source simultaneously.

7. The repairing assembly of claim 1, further comprising a second packer disposed downhole of the first packer, the repair zone defined between the first packer and the second packer, the fluid channel residing at the housing, the fluid channel arranged to direct the inert gas to an internal surface of the first packer, an internal surface of the second packer, and to the repair zone, the repairing assembly further compressing a first valve disposed at the internal surface of the first packer, a second valve disposed at the internal surface of the second packer, and a third valve disposed at a fluid outlet of the fluid channel, wherein the first, second, and third valves are operationally coupled to the controller and the controller configured to control the valves, thereby regulating a flow of inert gas along the fluid channel and selectively setting the first packer, the second packer, and injecting fluid into the repair zone.

8. The repairing assembly of claim 1, wherein the second packer is configured to be pushed, by a fluid injected into the repair zone through the first packer, downhole away from the first packer, expanding the repair zone.

9. The repairing assembly of claim 1, wherein the thermal spray assembly is configured to move, with the first packer and second packer set, with respect to the first packer and second packer.

10. The repairing assembly of claim 9, wherein the thermal spray assembly is configured to rotate without unsetting the first packer and second packer.

11. The repairing assembly of claim 9, wherein the thermal spray assembly is configured to cover a length of the casing that is 12 inches or less, and 120° or less of the casing.

* * * * *